United States Patent [19]

Ehrhardt

[11] Patent Number: 5,188,765
[45] Date of Patent: Feb. 23, 1993

[54] FLOW AGENT-DISPERSANT COMPOSITION

[75] Inventor: Gerry H. Ehrhardt, Adel, Iowa

[73] Assignee: Frederic S. Cluthe, Short Hills, N.J.

[21] Appl. No.: 755,607

[22] Filed: Sep. 5, 1991

Related U.S. Application Data

[63] Continuation of Ser. No. 475,852, Feb. 6, 1990, abandoned.

[51] Int. Cl.$^5$ .................. B01J 8/00; C09D 189/00; C09D 191/08
[52] U.S. Cl. .................. 252/363.5; 106/14.5; 106/31 R; 106/270; 252/356
[58] Field of Search .................. 106/270, 14.5, 31; 252/363.5, 356

[56] References Cited

U.S. PATENT DOCUMENTS

| | | | |
|---|---|---|---|
| 2,062,782 | 12/1936 | Epstein et al. | 252/1 |
| 2,090,537 | 8/1937 | Lund | 260/99.2 |
| 2,296,933 | 9/1939 | Jordan | 252/316 |
| 2,649,381 | 8/1953 | Hempel et al. | 106/31 X |
| 2,752,254 | 6/1956 | Dravtz | 106/14.5 |
| 2,777,817 | 1/1957 | Werly | 252/1 |
| 3,031,327 | 4/1962 | Newman | 106/31 X |
| 3,257,331 | 6/1966 | Jameston | 252/363.5 |
| 3,941,608 | 3/1976 | Ehrhardt et al. | 106/270 X |
| 3,997,674 | 12/1976 | Ukai et al. | 106/191 X |
| 4,128,430 | 12/1978 | Newman et al. | 106/31 |
| 4,400,295 | 8/1983 | Ootsu et al. | 252/356 |

FOREIGN PATENT DOCUMENTS 209065  6/1924  United Kingdom ............... 106/270

OTHER PUBLICATIONS

Letcher, "Waxes" in: Kirk-Othmer Encyclopedia of Chemical Technology, 3rd Ed., vol. 24, pp. 466-481.
Bergquist, D., "Eggs" in: Kirk-Othmer Encyclopedia of Chemical Technology, 3rd ed., (1981), vol. 8, p. 431.

Primary Examiner—Gary L. Geist

[57] ABSTRACT

Flow agent-dispersant composition for ink systems and the like comprising montan wax having from 3 to 10% of lecithin uniformly dispersed therein and a process for forming the same.

9 Claims, No Drawings

FLOW AGENT-DISPERSANT COMPOSITION

This is a continuation of application Ser. No. 07/475,852 filed Feb. 6, 1990, now abandoned.

This invention relates to improved dispersant and flow agent wax compositions for inclusion in mixtures of finely divided solids materials in readily liquifiable vehicles and particularly to improved dispersant-flow wax compositions for inks such as carbon paper inks and the like and to a process for making the same.

BACKGROUND OF THE INVENTION

Certain vegetable waxes, such as carnauba or ouricury wax or certain mineral waxes, such as montan wax, both basic and modified, have long been conventionally utilized to impart highly beneficial hardness and oil retention properties to ink systems, such as carbon paper inks, as well as to enhance the dispersion of solid particulate matter in diverse products incorporating readily liquifiable carrier vehicles. The continually increasing price of such vegetable and mineral wax materials, coupled with the uncertainties attendant their common sources of supply, has forced manufacturers to utilize continually decreasing amounts thereof in carbon paper inks and similar materials for selective functioning as "flow waxes" to obtain satisfactory dispersion properties therein, with other and less expensive materials being substituted therefor to impart the desired hardness and oil retention properties to the product. Even in such reduced amounts, however, the material costs for such vegetable and mineral waxes have risen to such an extent as to pose serious economic problems for the manufacturers of carbon paper inks and similar products.

The problem is one of long standing. Prior efforts in the art have been directed to the provision of domestically available synthetic waxes that are possessed of at least some desirable flow agent properties. While such synthetic waxes have provided some advantageous flow agent properties, they have not, as yet, provided the highly beneficial hardness and oil retention properties that are normally required in inks and like products that include a normally solid but readily liquifiable carrier vehicle. Exemplary of the foregoing are the modified synthetic waxes disclosed in U.S. Pat. Nos. 2,890,124, 2,890,125 and 3,163,548. These synthetic waxes, unfortunately, have likewise been characterized by progressively increasing costs for the resultant product and such has operated to accentuate rather than to alleviate the basic problem.

A more recent synthetic wax base product is disclosed in U.S. Pat. No. 3,941,608. Here again however, continually increasing raw material and processing costs have resulted in progressively increasing costs for the resultant product.

Apart from the increasing cost factor as above noted, the resultant economically dictated utilization of increasing amounts of paraffin wax and other substitutes for the above named vegetable and mineral waxes has increased the likelihood of detrimental gelling of the ink systems and other products being formulated therefrom.

As noted above, montan waxes, of both the basic and modified type, have been long recognized as having the ability to impart beneficial hardness and oil retention properties to, as well as the ability to enhance the dispersion of solid particulate matter in, diverse products utilizing readily liquifiable carrier vehicles. Basic montan wax is a mineral wax, solvent extracted from lignite, and is made up of a complex mixture of high molecular esters of long-chain aliphatic acids and wax alcohols. Both basic montan wax and chemically treated or modified montan waxes are hard waxes of microcrystalline structure and are commercially available products.

SUMMARY OF THE INVENTION

This invention may be briefly described as a chemically modified montan wax that can be advantageously employed as a dispersant-flow agent wax composition for ink systems and particularly for carbon paper inks and to methods of forming the same. In its broader aspects, the chemically modified montan wax product is obtained by the reaction of a montan wax with lecithin. In a narrower aspect, the invention includes the provision of a lecithin modified montan wax containing from three to about ten percent of lecithin.

Among the advantages of the subject invention is the provision of an effective dispersant for finely divided solids in liquifiable carrier vehicles, such as ink systems and particularly in carbon paper inks, that has flow imparting properties superior to those of natural vegetable waxes such as carnauba and ouricury, and available montan waxes, and which, in addition to markedly reducing the hazards of detrimental gelling, can be made available at a fraction of the cost of any of the presently available dispersant materials conventionally employed as flow agents in such environments. A further advantage is the provision of a simple and economic method of forming such improved dispersant-flow agents characterized by significantly low operating temperatures and markedly reduced raw material costs as compared to those attendant presently available modified natural and synthetic wax dispersants of the type identified above. A still further advantage of this invention is the provision of an improved wax like dispersant and flow agent to beneficially enhance the properties of liquifiable carrier vehicles for diverse products and permit the use of fillers and lower cost wax materials therein.

The primary object of this invention is the provision of a lecithin modified montan wax dispersant-flow agent for ink systems and particularly for carbon paper inks.

A further object of this invention is the provision of an economic method of producing an improved lecithin modified dispersant-flow wax for carbon paper inks.

Other objects and advantages of the subject invention will become apparent from the following portions of this specification and appended claims which, in accord with the mandate of the patent statutes, discloses the principles of the invention as embodied in presently preferred chemically modified montan wax dispersant-flow agent products and a process for forming the same.

DETAILED DESCRIPTION OF THE INVENTION

As previously pointed out, montan wax is a natural mineral wax obtained by solvent extraction from lignite and is the base constituent of the improved product. Montan wax is a naturally occurring fossil hard wax made up of a variety of waxes and is a complex mixture of high molecular esters of long chain aliphatic acids and alcohols in association with small amounts of color intensive asphaltic resins. Montan wax is available in basic solvent extracted form and as modified by various chemical aftertreatments. A primary producer of montan waxes is the VEB Braunkohlenwerk "Gustav Sobottka" DDR-4256 Roblingen am See, GDR which produces and sells both basic montan wax and modified or chemically aftertreated montan waxes under the trademark ROMONTA. Another producer of montan waxes is the American Lignite Products Co. of Ione, California which produces and sells both basic and modified or chemically aftertreated montan waxes under the trademark ALPCO. Preferred montan waxes of both the basic or modified types for use in the practice of this invention include, by way of example, the following:

| Montan Wax | Saponification Value (ASTM DF1389) | Acid Value (ASTM D1386) | Solidification Point (ASTM F766) |
| --- | --- | --- | --- |
| ROMONTA (Standard) | 85–100 | 27–33 | 167–185° F. |
| ROMONTA 76 | 85–95 | 14–20 | 172–181° F. |
| ROMONTA C | 90–105 | 23–28 | 172–182° F. |
| ROMONTA 6715 | 92–102 | 23–28 | 174–183° F. |
| ALPCO 16 (Standard) | 85–115 | 40–60 | 178–185° F. |
| ALPCO 1600 | 85–115 | 22–30 | 178–186° F. |
| ALPCO 1650 | | 23–28 | 179–188° F. |

The modifier reactant is lecithin. Lecithin is a phosphoglyceride or phosphotide or, more usually, a mixture of the diglycerides of stearic, palmitic and oleic acids linked to the choline ester of phosphoric acid. One of the most common and abundant phosphoglycerides is choline phosphoglyceride which, when pure, is a waxy white solid. Lecithin is commercially produced from soya bean oil and usually consists of a mixture of phosphatides, largely phosphatidyl-choline; phosphatidyl-ethanolamine and phosphatidyl-serine.

The dispersant-flow agent wax embodying the subject invention is generally formed by heating the montan wax base constituent to a temperature between 220° and 350° F., preferably about 235° F., in a mixing vessel with good agitation to render it highly fluid. Lecithin is slowly added, with continued agitation, in an amount in the range of from a minimum of about 3 to a maximum of about 10% by weight. If desired, the lecithin can be incrementally added to the molten montan wax. After lecithin addition has been completed the reaction, under continued agitation, is continued for at least one hour. After the reaction has been completed, the improved dispersant-flow agent in the nature of a lecithin modified montan wax may be flaked, prilled or otherwise cooled and mechanically processed to desired form.

By way of further example, two formulations of carbon paper ink employing varying amounts of the improved dispersant-flow agent were formulated and their comparative viscosities measured through use of a No. 2 Zahn cup having a delivery aperture of predetermined size therein. The inks were all heated to 200° F. and measured amounts thereof were introduced into the No. 2 Zahn cup. The time required to drain the cup, measured in seconds, is generally indicative of the relative viscosity of the particular carbon paper ink being tested. The lower the drain time period, the lower is the viscosity and vice versa. The two carbon paper ink formulations subjected to test and differing in the main wax vehicle were constituted as follows:

| Formula A | | Formula B | |
| --- | --- | --- | --- |
| Montan Wax Constituent | 6% | Montan Wax Constituent | 6% |
| Paraffin type slack wax | 42% | Microcrystalline type slack wax | 42% |
| Petrolatum | 15% | Petrolatum | 15% |
| 100 second paraffin oil | 12% | 100 second paraffin oil | 12% |
| Carbon black | 20% | Carbon black | 20% |
| Clay | 5% | Clay | 5% |

The following viscosity tabulation clearly indicates the beneficial characteristics of lecithin modified montan waxes:

| Specific Montan Wax Constituent | Formula A | Formula B |
| --- | --- | --- |
| Alpco 16 (standard) | no exit flow | no exit flow |
| Alpco 16 + 7% lecithin | 43 seconds | 60 seconds + |
| Alpco 1600 | no exit flow | no exit flow |
| Alpco 1600 + 7% lecithin | 38 seconds | 55 seconds |
| Alpco 1650 | 29 seconds | 45 seconds |
| Alpco 1650 + 7% lecithin | 23 seconds | 32 seconds |
| Romonta (Standard) | no exit flow | no exit flow |
| Romonta + 7% lecithin | 43 seconds | 60 seconds + |
| Romonta 6715 | 38 seconds | 60 seconds + |
| Romonta 6715 + 7% lecithin | 30 seconds | 55 seconds |
| Romonta 76 | 33 seconds | 47 seconds |
| Romonta 76 + 7% lecithin | 20 seconds | 22 seconds |
| Romonta C | 27 seconds | 45 seconds |
| Romonta C + 7% lecithin | 18 seconds | 21 seconds |

As will be apparent from the foregoing, the utilization of the lecithin modified montan wax has, in every instance, resulted in a marked decrease in the viscosity of the carbon paper ink at 200° F.

Beneficial properties derived from the use of the lecithin modified wax montan waxes have generally been obtained where the percentage of lecithin has varied between about three up to about ten percent by weight. A preferred percentage range for lecithin content is about 5 to 8% and optimum results appear to be obtained where the lecithin percentage is about seven percent. Lecithin addition of as little as 3 percent clearly improves the product, while lecithin additions of over ten percent do not appear to further markedly improve the viscosity and also may result in adverse effects on the hardness and oil retention characteristics of the finished product.

Generally indicative of the foregoing are the following viscosity values with variations in lecithin content in the Formula A composition utilizing Romonta C wax as the basic montan wax constituent:

| Romonta C | 27 sec. |
| --- | --- |
| Romonta C + 3% lecithin | 29 |
| Romonta C + 5% lecithin | 25 |
| Romonta C + 7% lecithin | 18 |
| Romonta C + 10% lecithin | 18 |

Further examples of viscosity reduction through lecithin addition to montan waxes, again employing the No. 2 Zahn cup and 200° F. wax, have been attained as follows:

| Wax | Lecithin | | | |
| --- | --- | --- | --- | --- |
| | 0% | 3% | 7% | 10% |
| Alpco 1650 | 45 | 40 | 32 | 31 |
| Romonta 6715 | no flow | 60 | 55 | 54 |

-continued

| Wax | Lecithin | | | |
|---|---|---|---|---|
|  | 0% | 3% | 7% | 10% |
| Romonta 76 | 47 | 38 | 22 | 23 |

In general, it appears that the amount of lecithin to be used is dependent, at least in part, upon the nature of the ink vehicle and the amount of pigment being utilized. Ink formulations with reduced pigment content appear to require less lecithin with permitted usage of a harder wax base. If larger amounts of pigment than that specified in Formula B are employed in the ink formulation, increased percentage of lecithin and/or increased percentage of montan wax constituent would appear to be required.

A further carbon black ink identified as Formula C, and comprising

| Montan Wax Constituent | 5% |
|---|---|
| Carnauba Wax | 2% |
| Slack Wax | 56% |
| 70 Sec. Paraffin Oil | 12% |
| Carbon Black | 20% |
| Clay | 5% | was made up in five samples that included the montan wax constituent as follows:

| Sample #1 | Romonta C |
|---|---|
| Sample #2 | Alpco 1650 |
| Sample #3 | Romonta C + 7% lecithin |
| Sample #4 | Romonta C + 7% lecithin |
| Sample #5 | Romonta C + 7% lecithin |

These samples were subjected to the above described viscosity testing under various aging conditions without agitation with the following results:

| Aging | #1 | #2 | #3 | #4 | #5 |
|---|---|---|---|---|---|
| Initial | 40 | 44 | 23 | 22 | 20 |
| 1 Hour | 42 | 52 | 30 | 33 | 30 |
| 2 Hours | 42 | 52 | 32 | 34 | 37 |
| 4 Hours | 43 | over 60 | 29 | 43 | 39 |
| 24 Hours | 45 | over 60 | 38 | 45 | 40 |

It appears from the above that the lecithin modified samples have generally improved aging qualities or stability, which facilitates the usage thereof in the commercial fabrication of diverse products.

It has been found that reaction time and temperature may be varied somewhat for different montan wax base constituents. By way of specific example, 465 grams of Romonta Type C wax having the typical specification:

| melting point °F. | 172-181 |
|---|---|
| acid value | 22-28 |
| saponification value | 92-110 |
| specific gravity @ 77° F. | 1.00 | was heated in an agitated vessel to about 235° F. After the montan wax reached 235° F., 35 grams of Archer Daniels Midland lecithin was added and the reaction was allowed to proceed for at least 30 minutes under continuing agitation. The molten material was then cooled into the desired form. The resultant lecithin modified wax had the following properties:

| melting point °F. | 175-185 |
|---|---|
| acid value | 8-14 |
| saponification value | 78-86 |
| specific gravity @ 77° F. | 1.08 |

As further illustrative of reaction temperature criticality, a fourth carbon black ink formulation constituted of

| Formula D | |
|---|---|
| Montan Wax Constituent | 5% |
| Carnauba Wax | 2% |
| Slack Wax #3 | 41% |
| Petrolatum | 15% |
| 120 sec paraffin oil | 12% |
| Carbon black | 20% |
| Clay | 5% | was made up in five samples with the montan wax constituent as follows:

| Sample 1 | Alpco 1650 |
|---|---|
| Sample 2 | Romonta 76 + 7% lecithin reacted at 300° F. |
| Sample 3 | Romonta 76 + 7% lecithin reacted at 275° F. |
| Sample 4 | Romonta 76 + 7% lecithin reacted at 235° F. |
| Sample 5 | Romonta C + 7% lecithin reacted at 235° F. |

These samples were subjected to the above described viscosity test under various aging conditions without agitation with the following results:

| Aging | #1 | #2 | #3 | #4 | #5 |
|---|---|---|---|---|---|
| Initial |  | 26 | 27 | 28 | 20 |
| 1 Hour | 48 | 27 | 33 | 35 | 24 |
| 2 Hours | 50 | 29 | 35 | 38 | 26 |
| 4 Hours | 52 | 29 | 36 | 42 | 27 |
| 24 Hours | 55 | 32 | 38 | 47 | 29 |

The herein described lecithin modified montan wax products maintain or improve the properties of montan wax with respect to hardness and oil retention and greatly enhances the flow and dispersion properties thereof. While the contemplated principle use of this product will be in the carbon paper industry, the lecithin modified montan wax product may well have significant application in other normally solid but liquifiable carrier vehicle products which require pigment dispersion. Some possible applications would be in printing inks, carbon ribbon inks, plastics, paint and polishes.

Having thus described my invention, I claim:

1. A discrete lecithin modified montan wax dispersant-flow agent product for inclusion in mixtures of finely divided solid materials in liquifiable carrier vehicles to enhance the hardness and oil retention properties thereof, comprising the solidified residue of the reaction product of reagents consisting essentially of agitated molten montan wax with 3 to 10% of introduced lecithin dispersed therewithin.

2. A dispersant-flow agent product as set forth in claim 1 with 5 to 8% of introduced lecithin therewithin.

3. A dispersant-flow agent product as set forth in claim 1 with about 8% of introduced lecithin therewithin.

4. A dispersant-flow agent product as set forth in claim 1 wherein said montan wax has a solidification point of between 165° and 190° F.; an acid value of between 5 and 80 and a saponification value of between 75 and 125.

5. A dispersant-flow agent product as set forth in claim 4 with about 5 to 8% of introduced lecithin therewithin.

6. A method of forming an improved, lecithin modified montan wax dispersant-flow agent product for inclusion in mixtures of finely divided solid materials in liquifiable carrier vehicles to enhance the hardness and oil retention properties thereof, consisting essentially of the steps of maintaining montan wax in a liquid condition at a temperature between 220° and 350° F. with continuous agitation thereof, adding from 3 to 10% of lecithin to said continuously agitated montan wax; and continuously agitating and maintaining the temperature of said liquified intermixture within said temperature range of 220° and 350° F. during lecithin addition and thereafter for a period of time sufficient to permit interreaction of the added lecithin with said montan wax, whereby said lecithin modified montan wax dispersant-flow agent product is a reaction product from reagents consisting essentially of lecithin and said montan wax.

7. A method as set forth in claim 6 wherein the temperature of said liquid montan wax is maintained within said stated range and at about 235° F.

8. A method as set forth in claim 6 wherein said lecithin is slowly added to the liquified and continuously agitated montan wax.

9. A dispersant-flow agent product that results from the method of claim 6.

* * * * *